(12) United States Patent
Kwon et al.

(10) Patent No.: US 11,915,691 B2
(45) Date of Patent: Feb. 27, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Dayoung Kwon, Suwon-si (KR); Hyeonmok Ko, Suwon-si (KR); Jonggu Kim, Suwon-si (KR); Seoha Song, Suwon-si (KR); Kyenghun Lee, Suwon-si (KR); Hojung Lee, Suwon-si (KR); Saebom Jang, Suwon-si (KR); Pureum Jung, Suwon-si (KR); Changho Paeon, Suwon-si (KR); Jiyeon Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 17/510,454

(22) Filed: Oct. 26, 2021

(65) Prior Publication Data
US 2022/0230063 A1 Jul. 21, 2022

Related U.S. Application Data

(63) Continuation of application No. PCT/KR2021/009276, filed on Jul. 19, 2021.

(30) Foreign Application Priority Data

Jan. 19, 2021 (KR) ........................ 10-2021-0007580

(51) Int. Cl.
*G10L 15/18* (2013.01)
*G10L 13/08* (2013.01)
(Continued)

(52) U.S. Cl.
CPC .............. *G10L 15/18* (2013.01); *G10L 13/08* (2013.01); *G10L 15/16* (2013.01); *G10L 15/26* (2013.01)

(58) Field of Classification Search
CPC ......... G10L 15/16; G10L 15/18; G10L 15/26; G10L 13/08; G10L 15/1822; G10L 15/22;
(Continued)

(56) References Cited

U.S. PATENT DOCUMENTS 9,292,832 B2 3/2016 Goel et al.
10,546,583 B2 1/2020 White et al.
(Continued)

FOREIGN PATENT DOCUMENTS

JP 2018-151578 A 9/2018
KR 10-2017-0101052 A 9/2017
(Continued)

OTHER PUBLICATIONS

International Search Report (PCT/ISA/210) dated Oct. 18, 2021 by the International Searching Authority in International Application No. PCT/KR2021/009276.
(Continued)

*Primary Examiner* — Abdelali Serrou
(74) *Attorney, Agent, or Firm* — Sughrue Mion, PLLC

(57) ABSTRACT

An electronic apparatus includes a communication interface; a memory configured to store at least one instruction; and a processor configured to execute the at least one instruction to: receive a text corresponding to a user utterance and information regarding a first external device; obtain a plurality of weights of a plurality of elements related to the first external device; identify a second external device for obtaining response information; control the communication interface to transmit the text corresponding to the user utterance to the second external device; receive first response infor-
(Continued)

mation regarding the user utterance from the second external device; obtain second response information; and control the communication interface to transmit the second response information to the first external device.

17 Claims, 12 Drawing Sheets

(51) Int. Cl.
*G10L 15/16* (2006.01)
*G10L 15/26* (2006.01)

(58) Field of Classification Search
CPC .......... G10L 15/1815; G10L 2015/223; G10L 15/30; G10L 15/063; G10L 13/027; G10L 2015/225; G10L 2015/088; G10L 25/30; G10L 15/04; G10L 15/197; G10L 2015/221; G10L 15/02; G10L 2015/228; G10L 13/00; G10L 2015/0635; G10L 25/72; G10L 15/142; G10L 15/19; G10L 15/193; G10L 15/28; G10L 17/00; G10L 19/00; G10L 2015/025; G10L 2015/0633; G10L 2015/0636; G10L 15/01; G10L 15/075; G10L 15/08; G10L 15/183; G10L 15/187; G10L 17/04; G10L 17/18; G10L 19/038; G10L 2015/027; G10L 25/21; G10L 25/51; G10L 25/54; G10L 25/60; G10L 25/69; G06F 40/30; G06F 40/35; G06F 16/3329; G06F 18/22; G06F 40/284; G06F 16/9024; G06F 3/167; G06F 40/295; G06F 17/18; G06F 40/205; G06F 40/216; G06F 40/237; G06F 40/289; G06F 40/56; G06F 16/288; G06F 18/24

See application file for complete search history.

(56) References Cited

U.S. PATENT DOCUMENTS

| | | | |
|---|---|---|---|
| 10,593,322 | B2 | 3/2020 | Roh et al. |
| 10,902,851 | B2* | 1/2021 | Kline ................. G06F 3/167 |
| 10,916,244 | B2* | 2/2021 | Kim ................... G06F 3/165 |
| 11,205,421 | B2* | 12/2021 | Firik .................. G06F 3/167 |
| 2008/0057925 | A1* | 3/2008 | Ansari ............... G10L 15/22 |
| | | | 455/414.4 |
| 2016/0179464 | A1* | 6/2016 | Reddy ............... G10L 15/22 |
| | | | 715/728 |
| 2017/0214781 | A1 | 7/2017 | Ichida et al. |
| 2017/0249355 | A1 | 8/2017 | Kang et al. |
| 2018/0293484 | A1* | 10/2018 | Wang ............... G06F 16/632 |
| 2019/0057684 | A1 | 2/2019 | Roh et al. |
| 2019/0385594 | A1 | 12/2019 | Park et al. |
| 2020/0074988 | A1 | 3/2020 | Park et al. |
| 2021/0217414 | A1 | 7/2021 | Hara et al. |
| 2021/0335344 | A1* | 10/2021 | Park ................. G10L 15/1822 |

FOREIGN PATENT DOCUMENTS

| | | |
|---|---|---|
| KR | 10-2019-0019401 A | 2/2019 |
| KR | 10-2025391 B1 | 9/2019 |
| WO | 2019/225201 A1 | 11/2019 |

OTHER PUBLICATIONS

Written Opinion (PCT/ISA/237) dated Oct. 18, 2021 by the International Searching Authority in International Application No. PCT/KR2021/009276.

* cited by examiner

ELECTRONIC APPARATUS AND CONTROLLING METHOD THEREOF

CROSS-REFERENCE TO RELATED APPLICATION(S)

This application is a bypass continuation application of International Application No. PCT/KR2021/009276, filed on Jul. 19, 2021, which claims priority to Korean Patent Application No. 10-2021-0007580, filed on Jan. 19, 2021, in the Korean Intellectual Property Office, the disclosures of which is incorporated herein in their entireties by reference.

FIELD

The disclosure relates to an electronic apparatus and a control method thereof, and, more particularly, to an electronic apparatus that obtains a response corresponding to a user utterance and a control method thereof.

DESCRIPTION OF RELATED ART

An artificial intelligence (AI) system is a computer system that implements human-level intelligence, and in contrast to the existing rule-based smart system, a machine learns, judges, and gets smarter by itself. As the AI system is used, it has better recognition rates and better understanding of users' preferences. Thus, the existing rule-based smart system is gradually being replaced by a deep learning-based AI system.

Recently, a conversation system using AI has been widely used. A user may chat with a personal assistant agent (e.g., Bixby) installed in a device constituting the conversation system to execute functions in the device or receive various services. Currently, a user's needs to receive a response to the user's personalized utterance is increasing. The existing user terminal might be able to only output a response only for the utterance set by the user and, thus, when an utterance that is not set by the user is input, the user terminal might not output a response. Accordingly, in order to receive a response to the user's personalized utterance, the user has to set a response for each utterance directly, which causes inconvenience to the user. Therefore, there is a need for a technology capable of outputting a response to an utterance that is not preset by the user.

SUMMARY

An aspect of the present disclosure is to provide an electronic apparatus capable of obtaining response information for a user's personalized utterance.

The technical problems of the present disclosure are not limited to the technical problems mentioned above, and other technical problems that are not mentioned will be clearly understood by those skilled in the art from the following description.

According to an aspect of the disclosure, an electronic apparatus may include a communication interface; a memory configured to store at least one instruction; and a processor configured to execute the at least one instruction to: receive a text corresponding to a user utterance and information regarding a first external device from the first external device via the communication interface; obtain a plurality of weights of a plurality of elements related to the first external device by inputting the text corresponding to the user utterance to a first neural network model; identify a second external device for obtaining response information regarding the user utterance from among a plurality of external devices based on the information regarding the first external device, information regarding the plurality of external devices, and the plurality of weights; control the communication interface to transmit the text corresponding to the user utterance to the second external device; receive first response information regarding the user utterance from the second external device via the communication interface; obtain second response information corresponding to the first external device by inputting the first response information and the information regarding the first external device to a second neural network model; and control the communication interface to transmit the second response information to the first external device.

The plurality of elements related to the first external device may include: a first element related to a similarity between a type of the first external device and types of the plurality of external devices; a second element regarding a distance between the first external device and the plurality of external devices; and a third element regarding a relationship between an owner of the first external device and a user that uttered the user utterance.

The processor may calculate a plurality of scores regarding relevance between the first external device and the plurality of external devices based on the information regarding the first external device, the information regarding the plurality of external devices and the plurality of weights; and identify the second external device based on the second external device having a greatest score from among the plurality of scores.

The first neural network model may include an intermediate model trained to predict a response to the text based on the text and information regarding the plurality of external devices. The first neural network model may be trained to output the plurality of weights of the plurality of elements.

The processor may identify a module for performing a function corresponding to a first response type included in the first response information; determine whether the module is included in the first external device; and determine whether to change the first response information to the second response information based on determining whether the module is included in the first external device.

The processor may, based on a first type of the first external device being different from a second type of the second external, determine to change the first response information.

The processor may identify a first response type that cannot be output by the first external device in the first response information; and obtain a second response type by inputting the first response type and information regarding a specification of the first external device to the second neural network model.

The second neural network model may be trained to output the first response type of the first response information and the second response type of the second response information based on a module that is not common to the first external device and the second external device.

The information regarding the plurality of external devices may include at least one of information regarding types of the plurality of external devices, information regarding specifications of the plurality of external devices, or information regarding locations of the plurality of external devices.

The information regarding the first external device may include at least one of information regarding a relationship between a user that uttered that user utterance and an owner of the first external device, information regarding a type of the first external device, information regarding a specification of the first external device, and information regarding a distance between the first external device and the plurality of external devices.

According to an aspect of the disclosure, a control method of an electronic apparatus may include receiving a text corresponding to a user utterance and information regarding a first external device from the first external device; obtaining a plurality of weights of a plurality of elements related to the first external device by inputting the text corresponding to the user utterance to a first neural network model; identifying a second external device for obtaining response information corresponding to the user utterance from among a plurality of external devices based on the information regarding the first external device, information regarding the plurality of external devices, and the plurality of weights; transmitting the user utterance to the second external device; receiving first response information regarding the user utterance from the second external device; obtaining second response information corresponding to the first external device by inputting the first response information and the information regarding the first external device to a second neural network model; and transmitting the second response information to the first external device.

The plurality of elements related to the first external device may include a first element related to a similarity between a type of the first external device and types of the plurality of external devices; a second element regarding a distance between the first external device and the plurality of external devices; and a third element regarding a relationship between an owner of the first external device and a user that uttered the user utterance.

The identifying the second external device may include calculating a plurality of scores regarding relevance between the first external device and the plurality of external devices based on the information regarding the first external device, the information regarding the plurality of external devices and the plurality of weights; and identifying the second external device based on the second external device having a greatest score from among the plurality of scores.

The first neural network model may include an intermediate model trained to predict a response to the text based on the text and information regarding the plurality of external devices. The first neural network model may be trained to output the plurality of weights of the plurality of elements.

The method may include identifying a module for performing a function corresponding to the first response type included in the first response information; determining whether the module is included in the first external device; and determining whether to change the first response information to the second response information based on determining whether the module is included in the first external device.

According to various embodiments, an electronic apparatus may obtain response information for a user's personalized utterance. Therefore, the user's satisfaction and convenience can be improved.

In addition, effects obtained or predicted by the embodiments of the present disclosure will be disclosed directly or implicitly in the detailed description. For example, various effects predicted by the embodiments of the present disclosure will be disclosed in the detailed description later.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
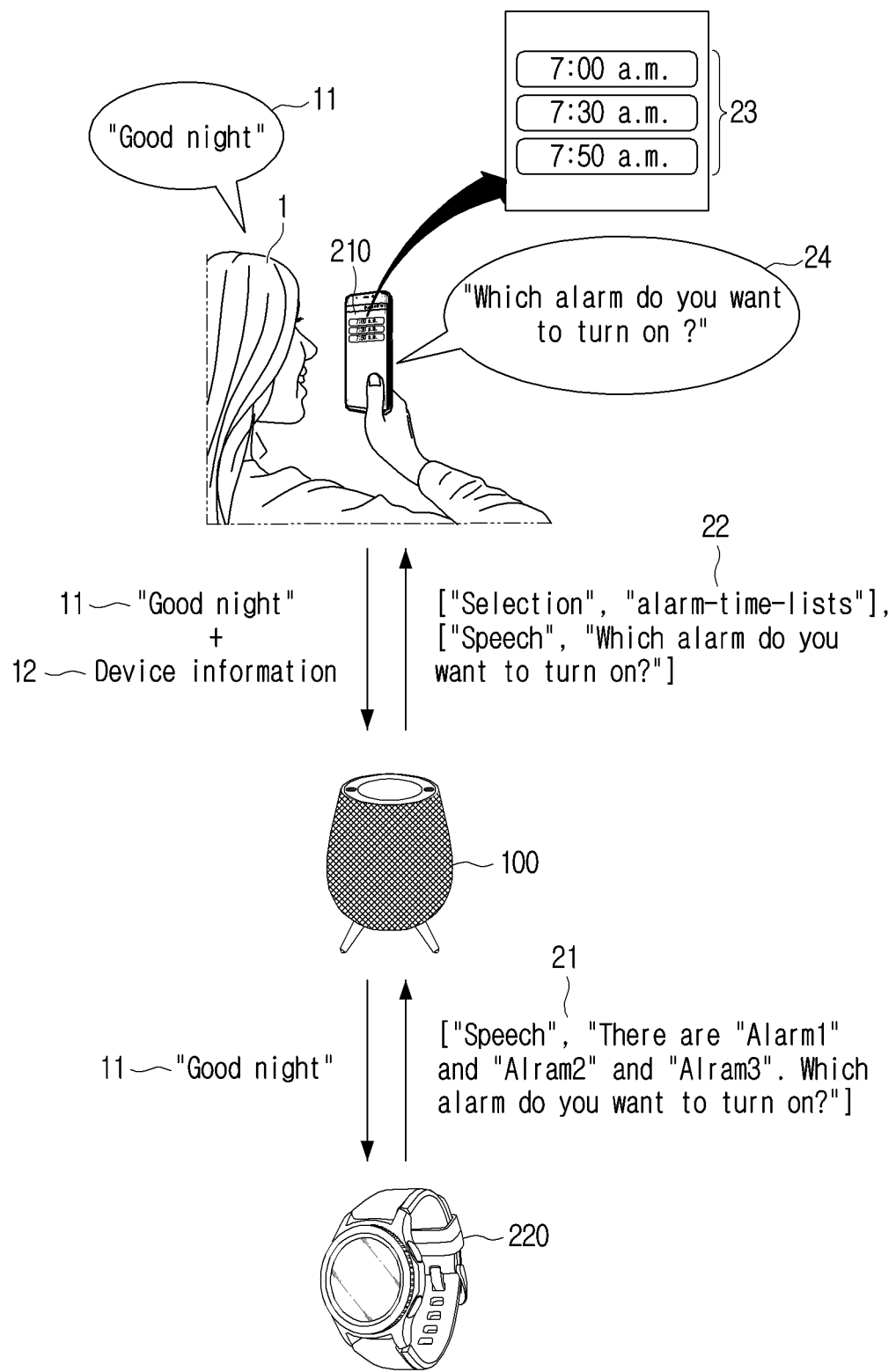
FIG. 1 is a view provided to explain a concept of a conversation system according to an embodiment.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

Embodiments of the disclosure may apply various modifications and have various embodiments, and specific embodiments will be illustrated in the drawings and described in detail in the detail description. However, this is not intended to limit the scope to the specific embodiment, and it should be understood to include all modifications, equivalents, and substitutes included in the scope of the disclosed spirit and technology. In describing the embodiments, when it is determined that the detailed description of the related known technology may obscure the gist, the detailed description thereof will be omitted.

The terms "first," "second," and the like, may be used to describe various components, but the components are not to be construed as being limited by the terms. The terms are used only to distinguish one component from other components.

Singular expressions include plural expressions unless the context clearly indicates otherwise. It should be further understood that terms "include" or "constitute" used in the application specify the presence of features, numerals, steps, operations, components, parts, or combinations thereof mentioned in the specification, but do not preclude the presence or addition of one or more other features, numerals, steps, operations, components, parts, or combinations thereof.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to the embodiments described herein. In addition, in the drawings, portions unrelated to the description will be omitted to obviously describe the disclosure, and similar portions will be denoted by similar reference numerals throughout the specification.

FIG. 1 is a view provided to explain a concept of a conversation system according to an embodiment. The conversation system may include an electronic apparatus 100, a first external device 210, and a second external device 220. Here, the first external device 210 is a device in which personalization is not completed, and the second external device 220 is a device in which personalization is completed. Accordingly, even with the same user utterance, the first external device 210 may not generate a response intended by a user, while the second external device 220 may generate a response intended by the user. Here, personalization means a process through which a device is trained to correspond to a user 1.

The first external device 210 may obtain a user utterance 11 from the user 1. When the user utterance 11 is obtained, the first external device 210 may determine whether it is possible to generate a response regarding the user utterance 11. If the user utterance 11 is a general utterance that can be responded to by the first electronic apparatus 210, the first electronic apparatus 210 may generate and output a response regarding the user utterance 11. However, if the user utterance 11 is not a general utterance, the first external device 210 may transmit the user utterance 11 and information 12 regarding the first external device 210 to the electronic apparatus 100. The information 12 regarding the first external device 210 may include at least one of information regarding relevance between the user 1 and the user (or owner) of the first external device 210, information regarding the specification of the first external device 210 or information regarding a distance between the first external device 210 and other external devices.

The electronic apparatus 100 may identify the second external device 220 from among a plurality of other external devices capable of communicating with the external apparatus 100 based on the user utterance 11 and the information 12 regarding the first external device 210. In this case, the electronic apparatus 100 may identify an apparatus with the highest relevance with the first external device 210 based on the user utterance 11 and the information 12 regarding the first external device 210 as the second external device 220.

The electronic apparatus 100 may transmit the user utterance 11 to the second external device 220. The second external device 220 where personalization is completed may obtain first response information 21 based on the user utterance 11. Subsequently, the second external device 220 may transmit the first response information 21 to the electronic apparatus 100. The first response information 21 may include a first response type and a first response content.

The first external device 210 and the second external device 220 may have different hardware specifications and thus, it may be necessary to change the first response information 21 generated by the second external device 220. For example, the size of the display of the second external device 220 may be smaller than a predetermined value and, thus, the display of the second external device 220 may not display a message including a plurality of texts. Accordingly, the first response information 21 generated by the second external device 220 may not include information regarding a response displaying a message. The size of the display of the first external device 210 may be larger than a predetermined value and thus, a message can be displayed. In such a situation, when the first external device 210 provides a feedback including a message display, satisfaction or convenience of the user 1 may be improved.

Accordingly, the electronic apparatus 100 may change the first response information 21 and obtain the second response information 22. In this case, the second response information 22 may include information regarding a response displaying a message. The electronic apparatus 100 may transmit the second response information 22 to the first external device 210. The first external device 210 may generate and output a response based on the second response information 22. For example, the first external device 210 may output a voice feedback 24 while displaying a response message 23. In other words, the first external device 210 may output a personalized response corresponding to the user utterance 11.

Figure 2:
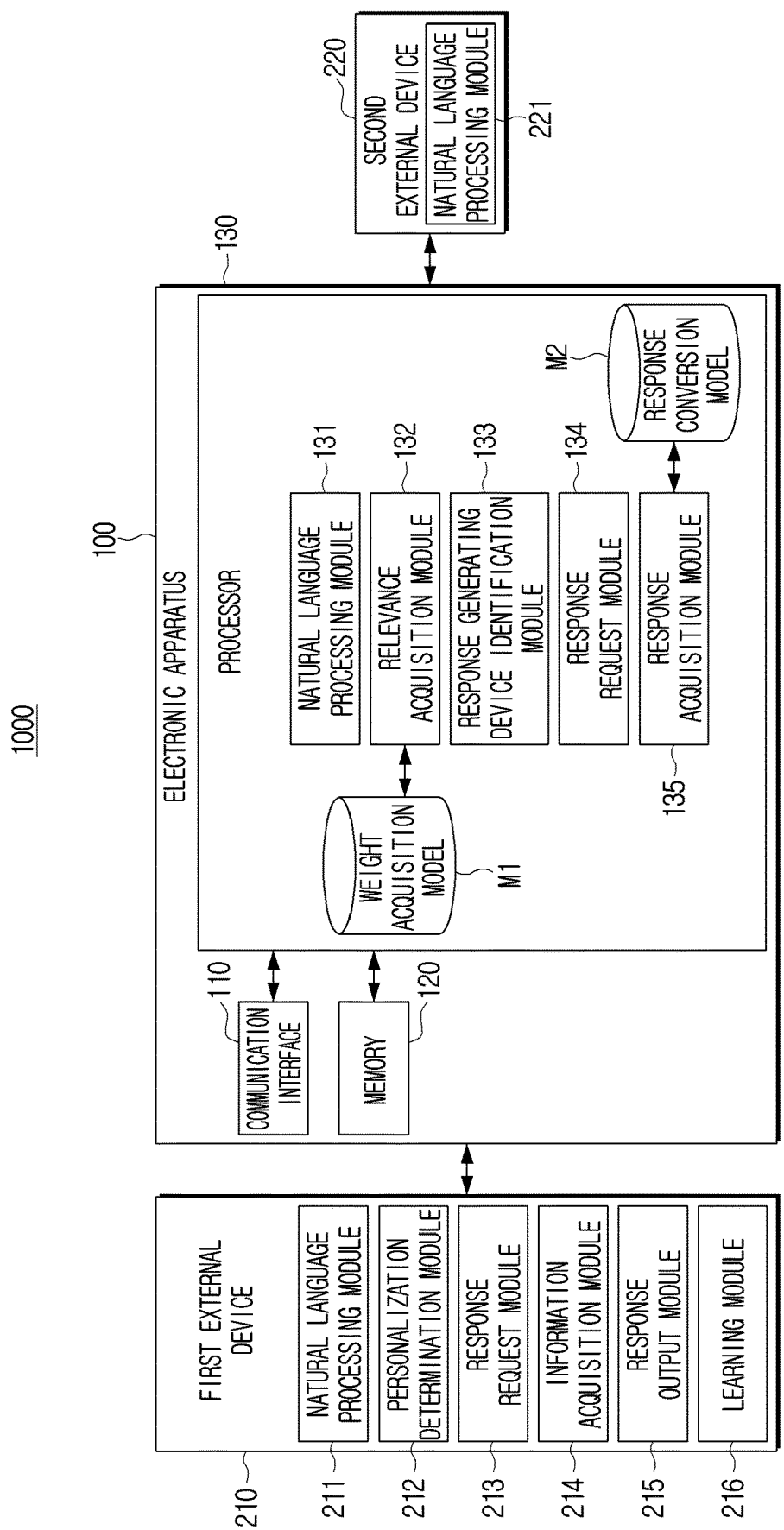
FIG. 2 is a block diagram illustrating configuration of a conversation system according to an embodiment.

FIG. 2 is a block diagram illustrating configuration of a conversation system according to an embodiment. A conversation system 1000 may include the electronic apparatus 100, the first external device 210, and the second external device 220. Each of the electronic apparatus 100, the first external device 210, and the second external device 220 may be a smartphone, a smart speaker, a tablet personal computer (PC) or a smart television (TV). However, each device is not limited to the above examples.

The first external device 210 may obtain a user utterance. The first external device 210 may perform natural language processing (NLP) on the user utterance to perform a function corresponding to the user utterance and output a response. To this end, the first external device 210 may include a natural language processing module 211. The natural language processing module 211 may include a speech recognition module, a natural language understanding module, a dialog management module, a natural language generation module, and a speech synthesis module.

The first external device 210 may determine whether it is necessary to personalize the first external device 210 using a personalization determination module 212. Here, personalization may refer to a process through which the first external device 210 is trained to correspond to a user. The personalization determination module 212 may determine whether it is necessary to personalize the first external device 210 based on whether the natural language processing module 211 may process a user utterance. For example, if a user utterance cannot be processed (or understood) since personalization of a language understanding module included in the natural language processing module 211 is not completed, the personalization determination module 212 may determine that personalization of the first external device 210 is required.

Based on determining that personalization is required, the first external device 210 may request response information corresponding to the user utterance from the electronic apparatus 100 using a response request module 213. The response request module 213 may transmit a text corresponding to the user utterance obtained through the natural language processing module 211 and information regarding the first external device 210 to the electronic apparatus 100. Here, the information regarding the first external device 210 may include information regarding the type or specification of the first external device 210, information regarding relevance (e.g., intimacy) between a user of the first external device 210 and users of other external devices and information regarding a distance between the first external device 210 and other external devices.

The information regarding the first external device 210 may be obtained by an information acquisition module 214. The information acquisition module 214 may obtain information regarding the first external device 210 using various methods. For example, the information acquisition module 214 may identify information regarding the specification of the first external device 210 that is pre-stored in the first external device 210. In another example, the information acquisition module 214 may perform user authentication to identify a user, and obtain information regarding relevance between the identified user and owners (or registered users) of other external devices. When the identified user and the owners of other external devices are the same, the relevance may be highest. In order to perform user authentication, the information acquisition module 214 may include a user authentication module. In another example, the information acquisition module 214 may obtain information regarding a distance between the first external device 210 and other external devices using a distance measuring sensor. The first external device 210 may be referred to as a response request device.

A response output module 215 may receive response information corresponding to a user utterance from the electronic apparatus 100. Here, the response information may include the type or form of a response, a response content, and a control command for controlling the first external device 210. The response output module 215 may obtain and output a response based on the response information.

A learning module may perform an operation for training the first external device 210 based on the obtained response and the user utterance. In particular, the learning module may train the natural language processing module 211 with a user utterance and a response corresponding to the user utterance as training data. In this case, the parameter or weight of the natural language processing module 211 may be updated. Accordingly, the first external device 210 in which learning is completed (i.e., personalization is completed) may generate a response corresponding to the user utterance.

If personalization is not completed, the first external device 210 may obtain a response corresponding to the user utterance from the electronic apparatus 100. The electronic apparatus 100 may obtain a response corresponding to the user utterance based on the user utterance received from the first external device 210 and information regarding the first external device 210. Hereinafter, the operation of the electronic apparatus 100 will be described.

The electronic apparatus 100 may include a communication interface 110, a memory 120 and a processor 130. For example, the electronic apparatus 100 may be a smart speaker, a smart TV, a tablet PC or a smartphone. The electronic apparatus 100 may be referred to as a hub device. Each component of the electronic apparatus 100 will be described as follows.

The communication interface 110 includes at least one circuit, and may perform communication with various types of external devices or external servers. For example, the communication interface 110 may receive a user utterance from the first external device 210. In addition, the communication interface 110 may transmit the user utterance to the second external device 220.

The communication interface 110 may perform data communication wirelessly or via a wired connection. If communication is performed with the first external device 210 or the second external device 220 using a wireless communication method, the communication interface 110 may include at least one of a wireless fidelity (Wi-Fi) communication module, a cellular communication module, a 3rd Generation (3G) mobile communication module, a 4th Generation (4G) mobile communication module, a 4G Long Term Evolution (LTE) communication module, or a 5th Generation (5G) mobile communication module. The communication interface 110 may perform communication with each of the first external device 210 and the second external device 220 using different methods. For example, the communication interface 110 may perform communication with the first external device 210 using a first communication method (e.g., Wi-Fi), and perform communication with the second external device 220 using a second communication method (e.g., Bluetooth).

The memory 120 may store an operating system (OS) for controlling the overall operations of the components of the electronic apparatus 100 and commands or data related to the components of the electronic apparatus 100. For example, the memory 120 may store information regarding the first external device 210 and the second external device 220. Each of the information regarding the first external device 210 and the second external device 220 may include information regarding the specification of each of the first external device 210 and the second external device 220 or information regarding a user. In addition, the memory 120 may store location information of each of other external devices around the electronic apparatus 100. Further, the memory 120 may store information regarding a module for performing a function corresponding to each response type. Here, the module may include a hardware module (e.g., a natural language processing module) and a software module (e.g., a touch display). The memory 120 may be implemented as a non-volatile memory (e.g., hard disk, solid state drive (SSD), flash memory), a volatile memory, etc.

The processor 130 may control the overall operations of the electronic apparatus 100. The processor 130 may include a natural language processing module 131, a relevance acquisition module 132, a response generating device identification module 133, a response request module 134, a response acquisition module 135, a weight acquisition model M1, and a response conversion model M2. The natural language processing model 131 may perform natural language processing regarding a user utterance in a similar manner as the natural language processing module 211 of the first external device 210. Because the natural language processing module 131 corresponds to the natural language processing module 211, detailed description thereof will be omitted.

There may be a plurality of external devices capable of communicating with the electronic apparatus 100. In this case, the electronic apparatus 100 may identify an external device (e.g., the second external device 220) with the greatest relevance (or similarity) to the first external device 210 from among the plurality of external devices, and obtain response information corresponding to a user utterance from the identified external device. To this end, the electronic apparatus 100 may obtain relevance scores between the first external device 210 and other external devices using the relevance acquisition module 132.

The relevance acquisition module 132 may obtain a weight of each of a plurality of elements related to the first external device 210 by inputting a user utterance to a weight acquisition model M1. Here, the plurality of elements related to the first external device 210 may include a first element related to a characteristic (e.g., type or specification) of the first external device 210 and similarity of characteristics of other external devices, a second element regarding a distance between the first external device 210 and other external devices, and a third element regarding a relationship between the owner (or registered user) and a user. The weight acquisition model M1 is a trained neural network model, and may be trained to receive a user utterance and output a weight regarding each of a plurality of elements indicating relevance.

The relevance acquisition module 132 may calculate a relevance score based on information and weights regarding the first external device 210 and other external devices. For example, the first external device 210 and the second external device 220 may be speakers, and the third external device may be a TV. In this case, if the weight of the first element is the largest from among the weight of each of a plurality of elements indicating the relevance, the relevance score for the second external device 220 may be greater than the relevance score for the third external device.

The response generating device identification module 133 may identify a response generating device from among a plurality of external devices based on a relevance score. For example, the response generating device identification module 133 may identify the second external device 220 having the greatest relevance score with the first external device 210. The response request module 134 may control the communication interface 110 to transmit a response request corresponding to a user utterance to the second external device 220. In this case, the communication interface 110 may transmit the user utterance received from the first external device 210 to the second external device 220.

The second external device 220 is a device in which user personalization is completed, and may obtain response information corresponding to a user utterance using the natural language processing module 221. Here, the natural language processing module 221, similar to the natural language processing module 211, may include a speech recognition module, a natural language understanding module, a dialog management module, a natural language generation module, and a speech synthesis module. However, since the second external device 220 is a device in which personalization is completed, the parameter value of the language understanding module of the second external device 220 may be different from the parameter value of the language understanding module of the first external device 210.

The response acquisition module 135 may receive response information corresponding to a user utterance from the second external device 220 via the communication interface 110. For example, the response information may include a first response type (or 'a selection event') in which selectable user interface (UI) elements are displayed and a response content (e.g., "alarm 1: 7:00", "alarm2: 7:30") corresponding to the first response type. In addition, the response information may include a second response type (e.g., a voice feedback) and a response message (e.g., "which alarm do you want to turn on?") corresponding to the second response type. The response acquisition module 135 may control the communication interface 110 to transmit the received response information to the first external device 210. The first external device 210 may perform a function corresponding to the user utterance based on the response information received from the electronic apparatus 100.

The first external device 210 and the second external device 220 may be different types of devices. For example, the first external device 210 may be a speaker that does not include a display, and the second external device 220 may be a TV. In this case, the first external device 210 may not perform a function corresponding to the response information obtained by the second external device 220. Specifically, if the response information obtained by the second external device 220 includes a response type that displays a selectable UI element, the first external device 210 may not perform a function corresponding to the response information since the first external device 210 does not include a display.

In another example, the first external device 210 may be a TV, and the second external device 220 may be a speaker that does not include a display. In this case, the first external device 210 may receive response information including a voice feedback obtained by the second external device 220 via the electronic apparatus 100. Because the first external device 210 includes a speaker, a function corresponding to the response information obtained by the second external device 220 (i.e., output of a voice message) may be performed. However, if the first external device 210 is capable of outputting a response to a user using a display, the user satisfaction or convenience can be further improved. For example, the first external device 210 may output a voice message (e.g., "which alarm do you want to turn on?") while displaying a selectable UI element (e.g., "alarm 1: 7:00", "alarm 2: 7:30").

As such, in some cases, it may be necessary to change the response information received from the second external device 220 to output a response. Accordingly, the response acquisition module 135 may obtain new response information by changing the response information received from the second external device 220. For example, the response acquisition module 135 may change a response type and a response content based on the response information received from the second external device 220 and the information (e.g., specification information) regarding the first external device 210. Specifically, the response acquisition module 135 may obtain the second response information corresponding to the first external device 210 by inputting the first response information received from the second external device 220 and the information regarding the first external device 210 to the response conversion model M2. Here, the response conversion model M2 is a trained neural network model, and may be trained to receive information regarding a specific device and response information and output response information corresponding to the specific device.

The response acquisition module 135 may select only some of the information received from the second external device 220 and input the selected information to the response conversion model M2. For example, the response acquisition module 135 may identify a response content that cannot be performed by the first external device 210 among the received response information and a response content corresponding to the response type. Subsequently, the response acquisition module 135 may obtain new response information by inputting the identified response type and response content and the information regarding the first external device 210 to the response conversion model M2. The response acquisition module 135 may control the communication interface 110 to transmit the new response information to the first external device 210.

The response acquisition module 135 may determine whether it is necessary to change the first response information. For example, the response acquisition module 135 may compare the specification information of the first external device 210 and the specification information of the second external device to determine whether it is necessary to change the first response information. For example, if the first external device 210 includes a display and the second external device 220 does not include a display, the response acquisition module 135 may determine that it is necessary to change the first response information.

In another example, the response acquisition module 135 may determine whether it is necessary to change the first response information based on the information regarding the first external device 210 and the first response information. Specifically, the response acquisition module 135 may identify a module for performing a function corresponding to the first response type included in the first response information based on information regarding modules of various response types stored in the memory 120. In addition, the response acquisition module 135 may determine whether the identified module is included in the first external device 210 based on the information regarding the first external device 210. In this case, if the identified module is not included in the first external device 210, the response acquisition module 135 may determine that it is necessary to change the first response information.

According to an embodiment, the weight acquisition model M1 may be implemented as a random forest (RF), and the response conversion model M2 may be implemented as a convolutional neural network (CNN) model. However, this is only an example, and the weight acquisition model M1 and the response conversion model M2 may be implemented as at least one artificial neural network model from among a deep neural network (DNN), a recurrent neural network (RNN), or a generative adversarial network (GAN).

In FIG. 2, each module (131 to 135) of the electronic apparatus 100 and the models (M1, M2) are described as components of the processor 130, but this is only an example. The modules (131 to 135) and the models (M1, M2) may be stored in the memory 120. In this case, the processor 130 may load the modules (131 to 135) and the models (M1, M2) stored in the memory 120 onto a volatile memory from a non-volatile memory and execute each function of the plurality of modules (131 to 135). In addition, each module of the processor 130 may be implemented as software or may be implemented in a form in which software and hardware are combined.

Figure 3:
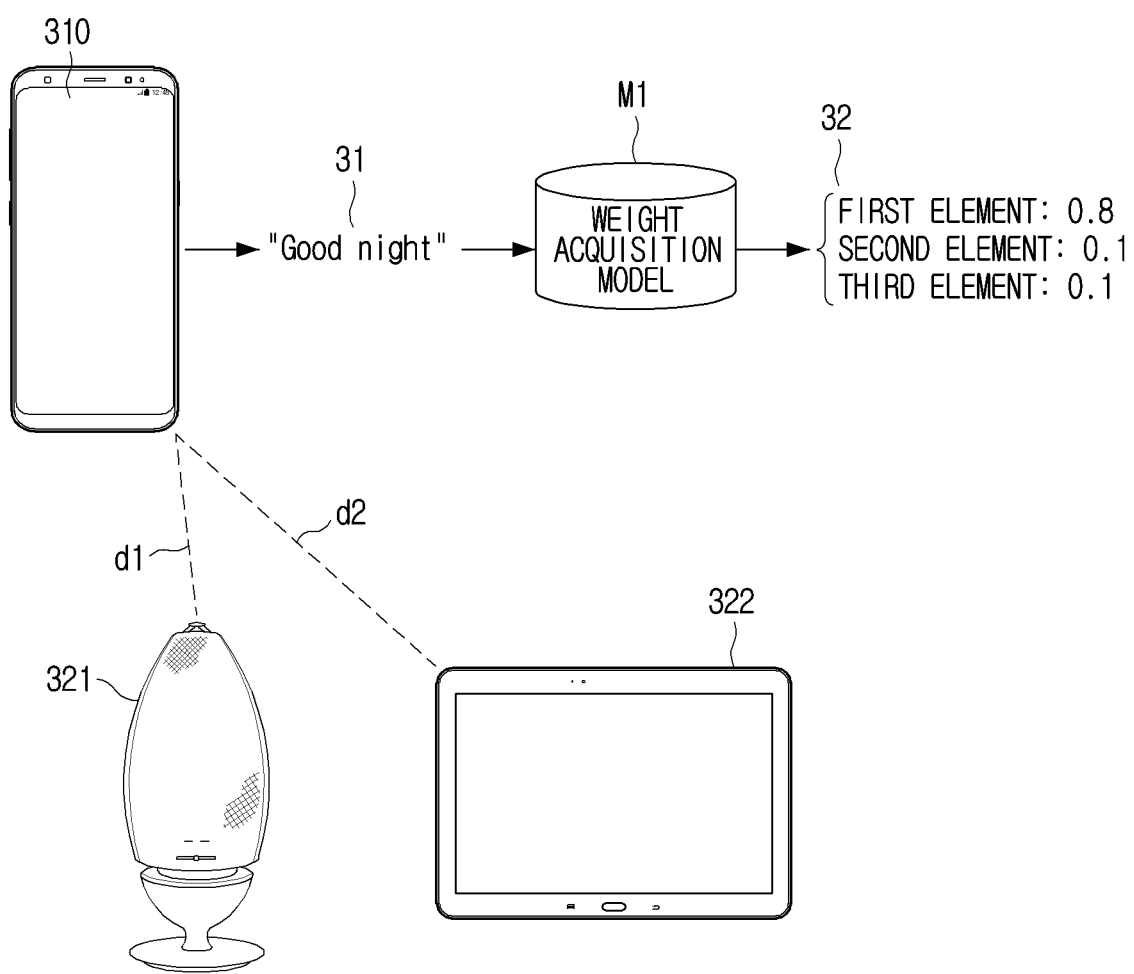
FIG. 3 is a view provided to explain a method of identifying a response generating device according to an embodiment.

FIG. 3 is a view provided to explain a method of identifying a response generating device according to an embodiment. The electronic apparatus 100 may obtain a weight 32 for each of a plurality of elements related to a response request device 310 by inputting a user utterance 31 received from the response request device 310 to the weight acquisition model M1. Subsequently, the electronic apparatus 100 may identify a response generating device to generate a response to the user utterance 31 based on the weights 32 from among a plurality of external devices 321 and 322.

The electronic apparatus 100 may compare information regarding the response request device 310 and information regarding the external devices 321 and 322 to obtain relevance between the response request device 310 for each element and the external devices 321 and 322. For example, the electronic apparatus 100 may compare the type of the response request device 310 and the types of the external devices 321 and 322 and obtain relevance regarding the first element. If the first device 321 is a speaker that does not include a display and the second device 322 is a tablet PC that includes a display, the relevance between the response request device 310 and the first element of the second device 322 may be greater than the relevance between the response request device 310 and the first element of the first device 321.

In addition, the electronic apparatus 100 may obtain relevance regarding the second element based on the distance between the response request device 310 and the external devices 321 and 322. If the first distance (d1) between the response request device 310 and the first device 321 is less than the second distance (d2) between the response request device 310 and the second device 322, the first device 321 may have a greater relevance regarding the second element than the second device 322.

The electronic apparatus 100 may calculate a relevance score for each of the external devices 321 and 322 based on the relevance for each element and the weight 32 for each element. Subsequently, the electronic apparatus 100 may identify a device having the greatest relevance score from among the external devices 321 and 322 as the response generating device. For example, if the weight of the first element is greater than the weight of the second element, the relevance score of the second device 322 may be greater than the relevance score of the first device 321. In this case, the electronic apparatus 100 may identify the second device 322 as the response generating device.

The user utterance 31 may be a text corresponding to an audio signal, but is not limited thereto. The user utterance 31 may be a vector based on an audio signal or a text. If the user utterance 31 is an audio signal, the electronic apparatus 100 may obtain a text corresponding to the user utterance 31 using a natural language processing module, and input the obtained text to the weight acquisition model M1.

In order to obtain an accurate response for the user utterance 31, the electronic apparatus 100 may need to obtain the relevance between the response request device 310 and the external devices 321 and 322 accurately. To this end, the performance of the trained weight acquisition model M1 is important. Hereinafter, the learning method of the weight acquisition model M1 will be described.

Figure 4:
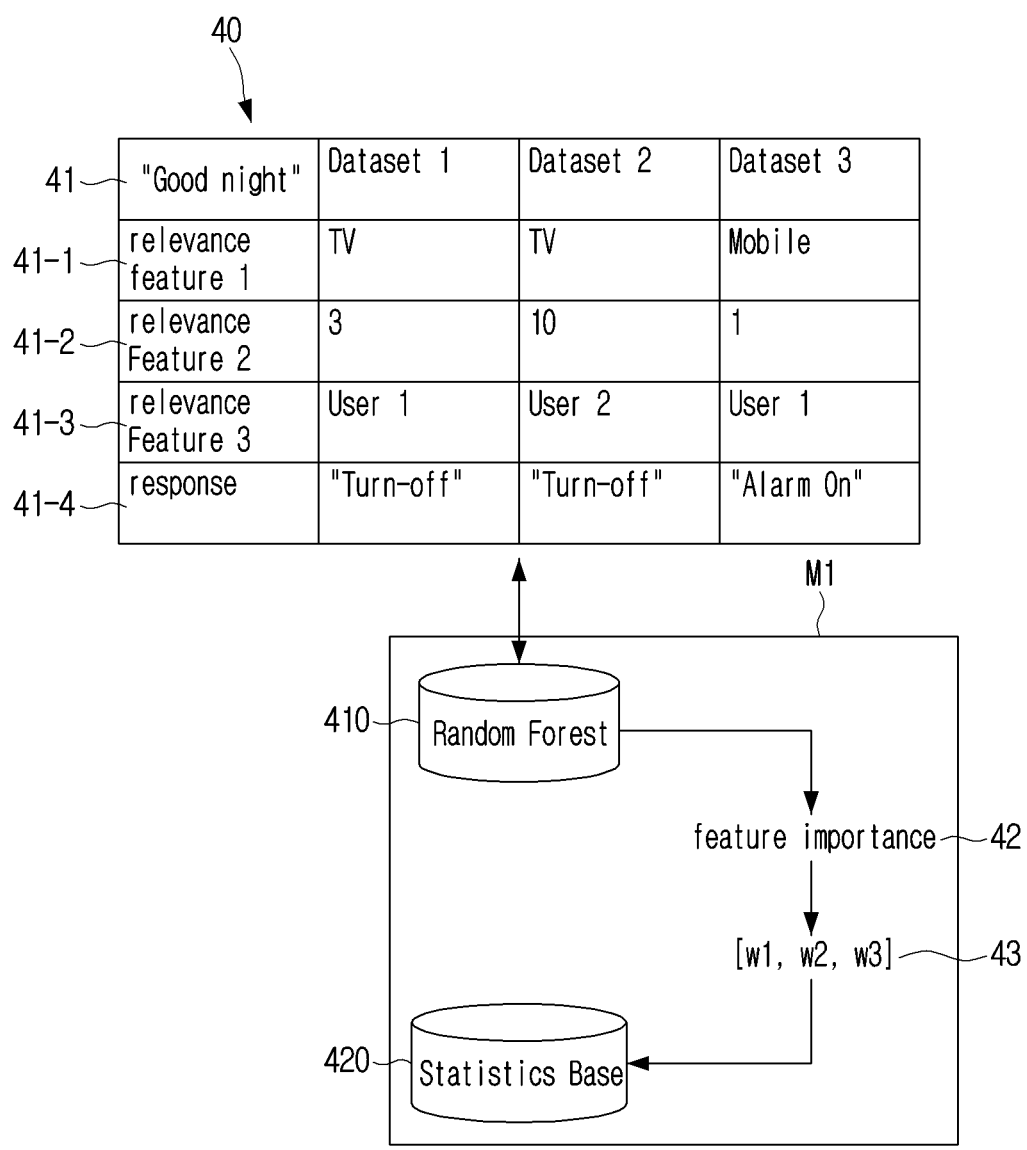
FIG. 4 is a view provided to explain a learning method of a weight acquisition model according to an embodiment.

FIG. 4 is a view provided to explain a learning method of a weight acquisition model according to an embodiment. The training data 40 of the weight acquisition model M1 may include a user utterance 41, a first relevance feature 41-1, a second relevance feature 41-2, a third relevance feature 41-3, and a response 41-4 corresponding to the user utterance 41. The first relevance feature 41-1 may be associated with information regarding the type or specification of a response request device. The second relevance feature 41-2 may be associated with information regarding a distance between a response request device and a response generating device. The third relevance feature 41-3 may be associated with information regarding a user of a response request device.

The weight acquisition model M1 may include a random forest model 410 and a statistical base 420. Here, the random forest model 410 is an intermediate model for obtaining feature importance indicating how much various information affects response generation. The statistical base 420 is a space for storing a weight for each element obtained in the learning process of the random forest model 410.

The random forest model 410 may be trained to predict the response 41-4 based on a plurality of datasets (e.g., dataset 1, dataset 2, dataset 3) including the first to third features 41-1, 41-2, and 41-3 corresponding to the user utterance 41, respectively. In addition, the electronic apparatus 100 may obtain a feature importance 42 for each relevance feature included in each dataset in the learning process of the random forest model 410. For example, the electronic apparatus 100 may calculate the feature importance 42 based on a cross entropy and a Gini importance. The electronic apparatus 100 may calculate a normalized value corresponding to the feature importance 42, and the calculated normalized value may be a weight 43 for each element. The electronic apparatus 100 may update the statistical base 420 by storing the weight 43 in the statistical base 420.

The electronic apparatus 100 may input a user utterance to the weight acquisition model M1 for which learning has been completed. In this case, the weight acquisition model M1 for which learning is completed may identify and output a weight corresponding to the user utterance in the statistical base 420.

Figure 5A:
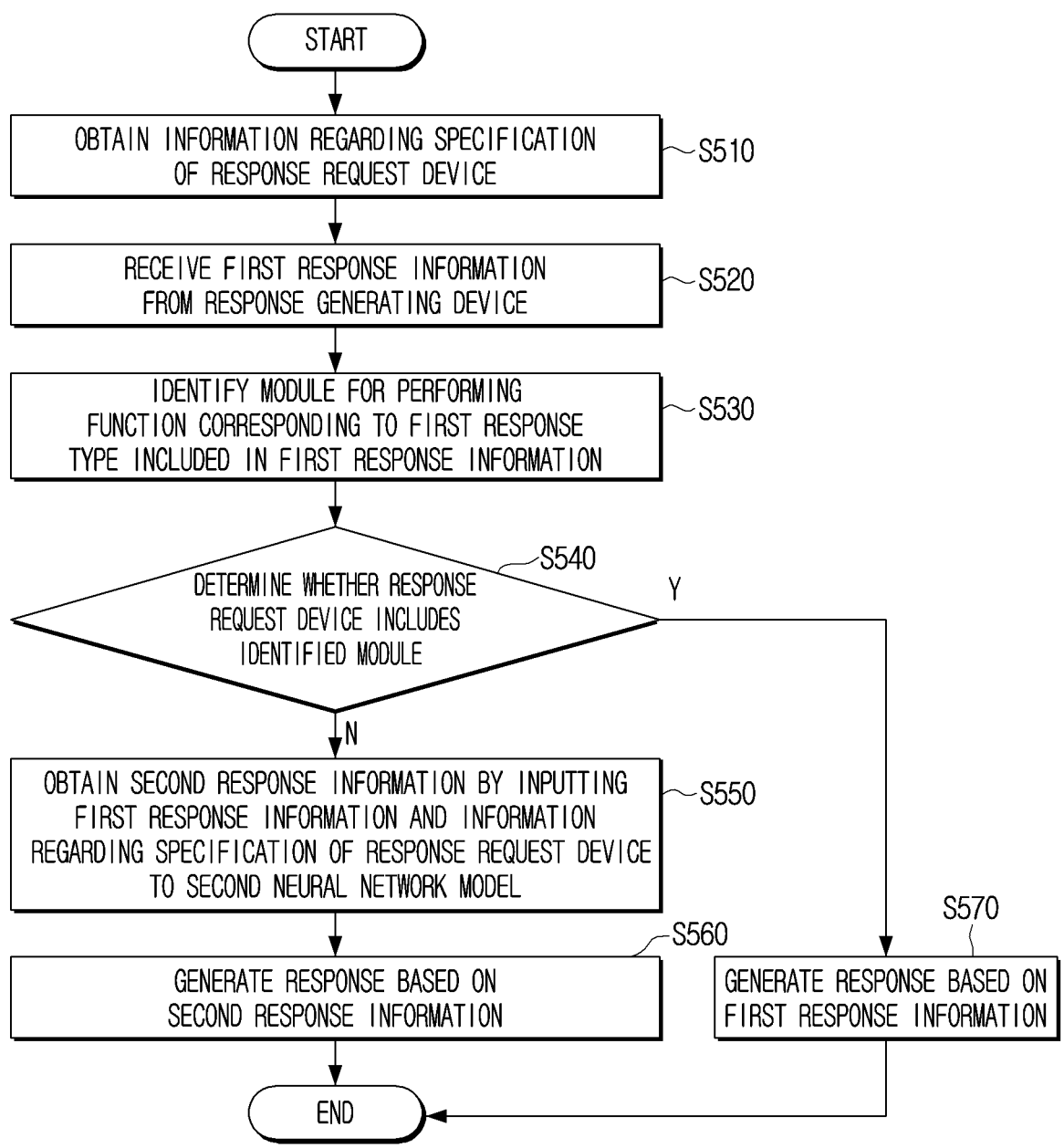
FIG. 5A is a view provided to explain a method of generating a response according to an embodiment.

FIG. 5A is a view provided to explain a method of generating a response according to an embodiment. The electronic apparatus 100 may obtain information regarding the specification of the response request device (operation S510), and receive the first response information from the response generating device (operation S520).

Figure 5B:
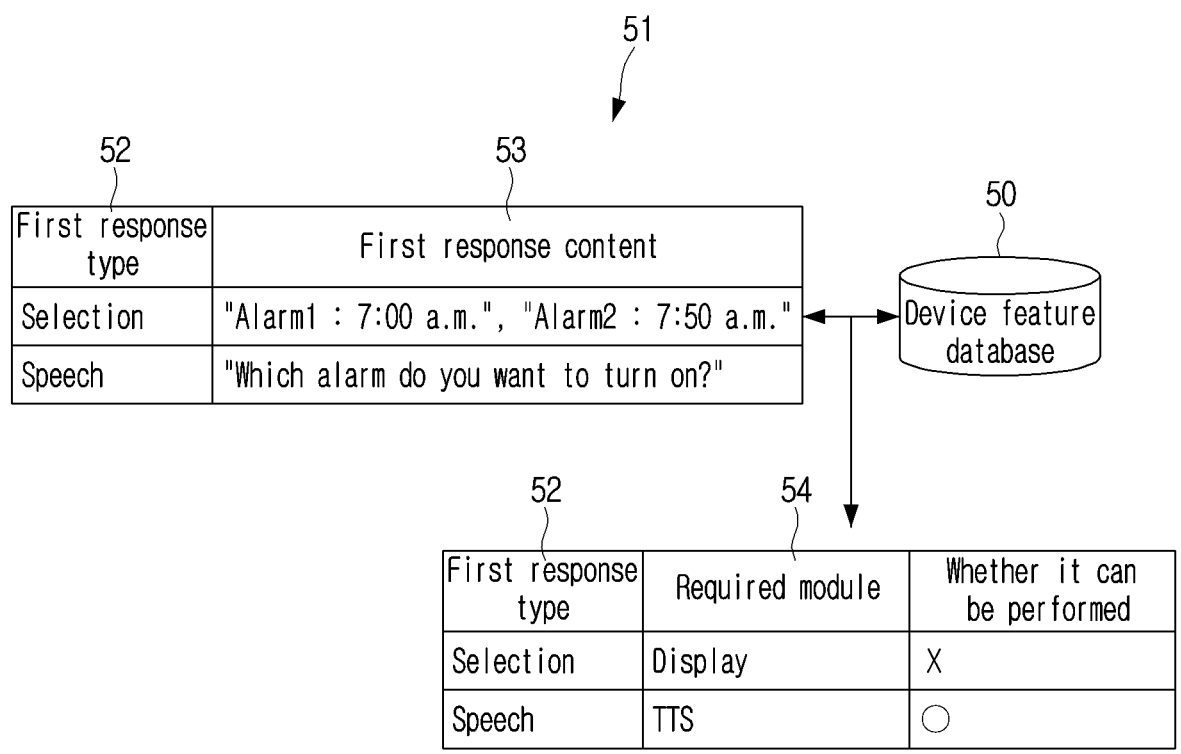
FIG. 5B is a view provided to explain a method for determining whether it is required to change a response according to an embodiment.

The electronic apparatus 100 may identify a module for performing a function corresponding to the first response type included in the first response information (operation S530). Referring to FIG. 5B, first response information 51 may include a first response type 52 and a first response content 53. The electronic apparatus 100 may identify a module 54 for performing a function corresponding to the first response type 52 by comparing the response type 52 and a device feature database 50. For example, the electronic apparatus 100 may identify a display module for performing a function corresponding to the 1-1 response type ('selection'). In addition, the electronic apparatus 100 may identify a text to speech (TTS) module for performing a function corresponding to the 1-2 response type ('speech'). The device feature database 50 may store a response type and information regarding a module or device specification required to perform a function corresponding to the response type. For example, the first 1-1 response type ('selection') and the display module may be matched to each other and stored in the device feature database 50. In addition, the 1-2 response type ('speech') and the TTS module may be matched to each other and stored in the device feature database 50. The device feature database 50 may be pre-stored in the memory 120.

The electronic apparatus 100 may determine whether the response request device includes the identified module (operation S540). Subsequently, the electronic apparatus 100 may determine whether the response request device is capable of performing a function corresponding to each response type based on whether the response request device includes the identified module. In FIG. 5B, if the response request device does not include the display module, the electronic apparatus 100 may determine that the response request device is not capable of performing a function corresponding to the 1-1 response type ('selection'). If the response request device includes the TTS module, the electronic apparatus 100 may determine that the response request device is capable of performing a function corresponding to the 1-2 response type ('speech').

Figure 5C:
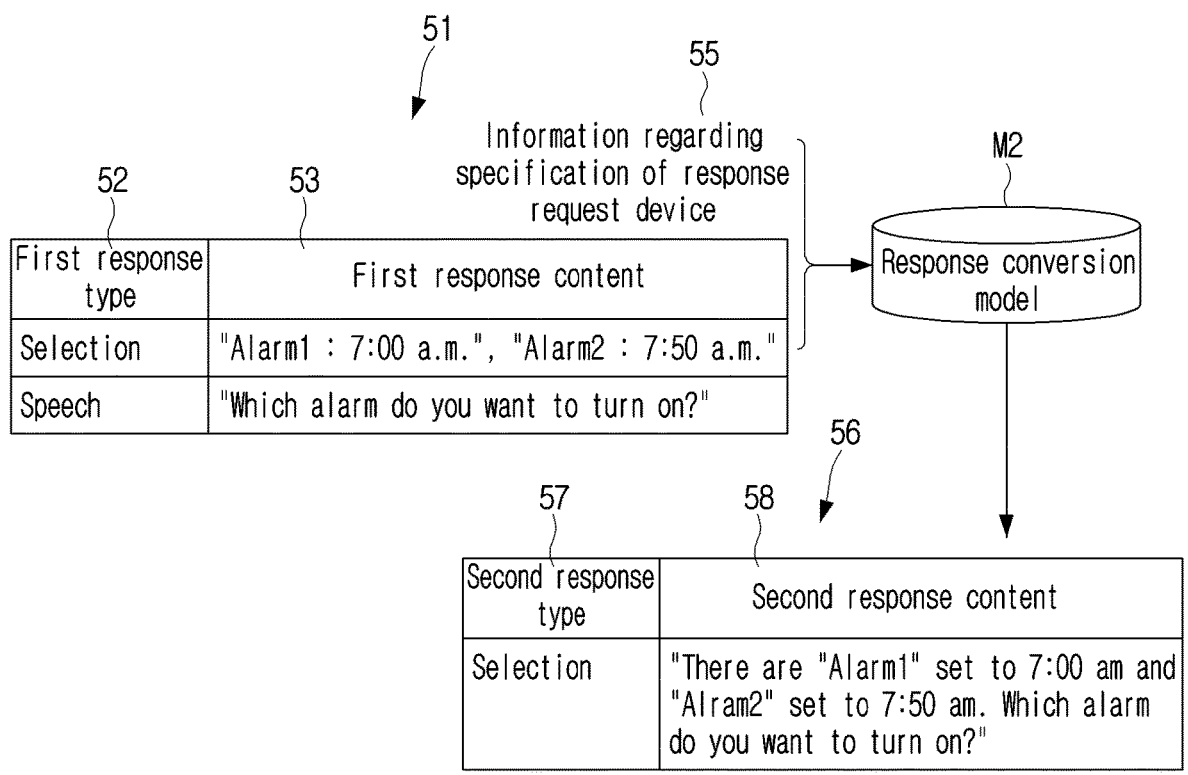
FIG. 5C is a view provided to explain a method of changing a response according to an embodiment.

If it is determined that the response request device does not include the identified module (operation S540—N), the electronic apparatus 100 may obtain the second response information by inputting the first response information and information regarding the specification of the response request device to the second neural network model (operation S550). Subsequently, the electronic apparatus 100 may generate a response based on the second response information (operation S560). Referring to FIG. 5C, the electronic apparatus 100 may obtain the second response information 56 by inputting the first response information 51 and information 55 regarding the specification of the response request device to the response conversion model M2. The electronic apparatus 100 may select information regarding some response types from the first response information 51, and input the selected information regarding some response types to the response conversion model M2. For example, the electronic apparatus 100 may input information regarding the 1-1 response type ('selection') that cannot be output by the response request device to the response conversion model M2.

If it is determined that the response request device includes the identified module (operation S540—Y), the electronic apparatus 100 may generate a response based on the first response information (operation S570).

Figure 5D:
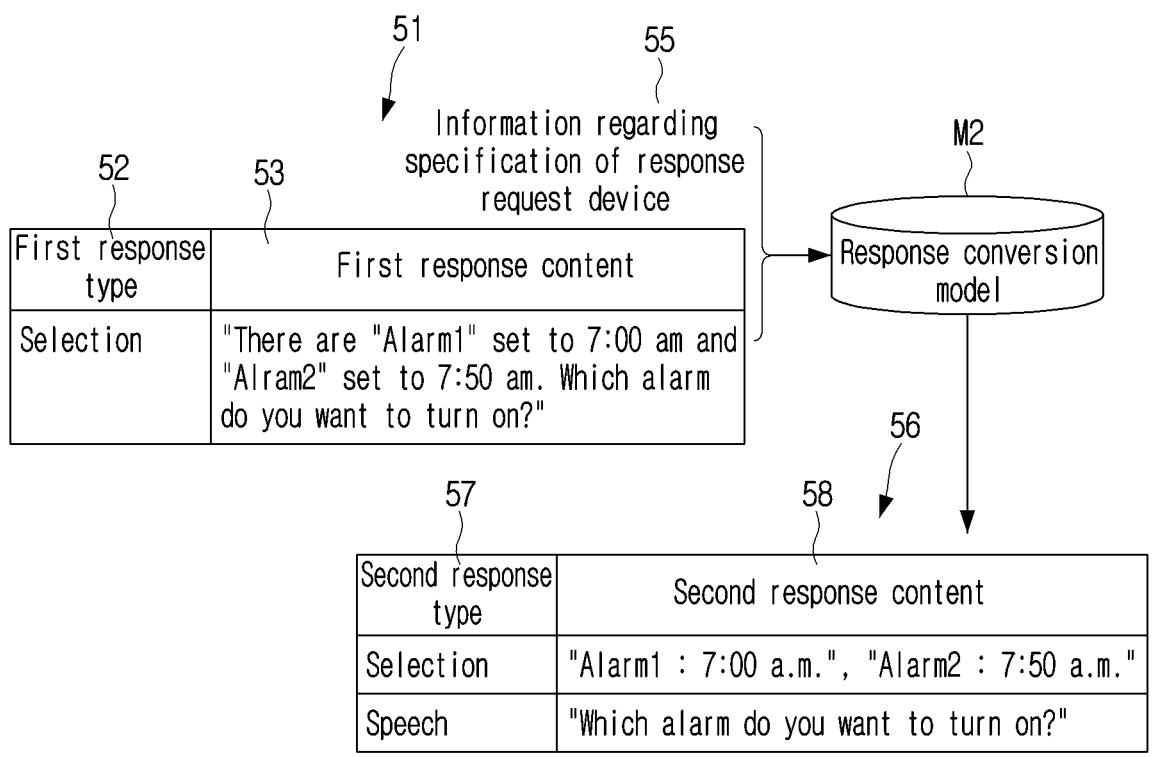
FIG. 5D is a view provided to explain a method of changing a response according to another embodiment.

Even if the response request device includes the identified module, the electronic apparatus 100 may obtain new response information by changing the response information. For example, even in the case where the first response information includes a voice feedback and the electronic apparatus 100 includes a display module and a natural language processing module, the electronic apparatus 100 may obtain new response information having a response type corresponding to the display module. Referring to FIG. 5D, the electronic apparatus 100 may obtain the second response information 56 by inputting the first response information 51 and the information 55 regarding the specification of the response request device to the response conversion model M2. In this case, even if the electronic apparatus 100 includes a module for performing a function corresponding to the response type (i.e., 'speech') included in the first response information 52, the electronic apparatus 100 may obtain the second response information 56. Accordingly, user satisfaction and convenience can be improved.

Figure 6:
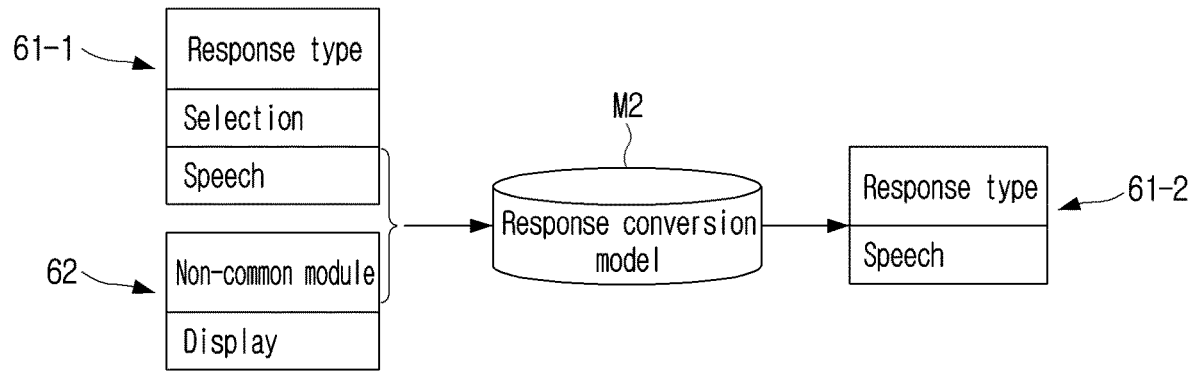
FIG. 6 is a view provided to explain a learning method of a response conversion model according to an embodiment.

FIG. 6 is a view provided to explain a learning method of a response conversion model according to an embodiment. The learning data of the response conversion model M2 may include information regarding a first response type 61-1, information regarding a second response type 61-2 and information regarding a non-common module 62. The non-common module 62 refers to a module which is not commonly included in any two devices. For example, if the first device is a speaker that does not include a display and the second device is a display, the non-common module 62 may be the display module. The response conversion model M2 may be trained to output information regarding the second response type 61-2 based on information regarding the first response type 61-1 and information regarding the non-common module 62.

Figure 7:
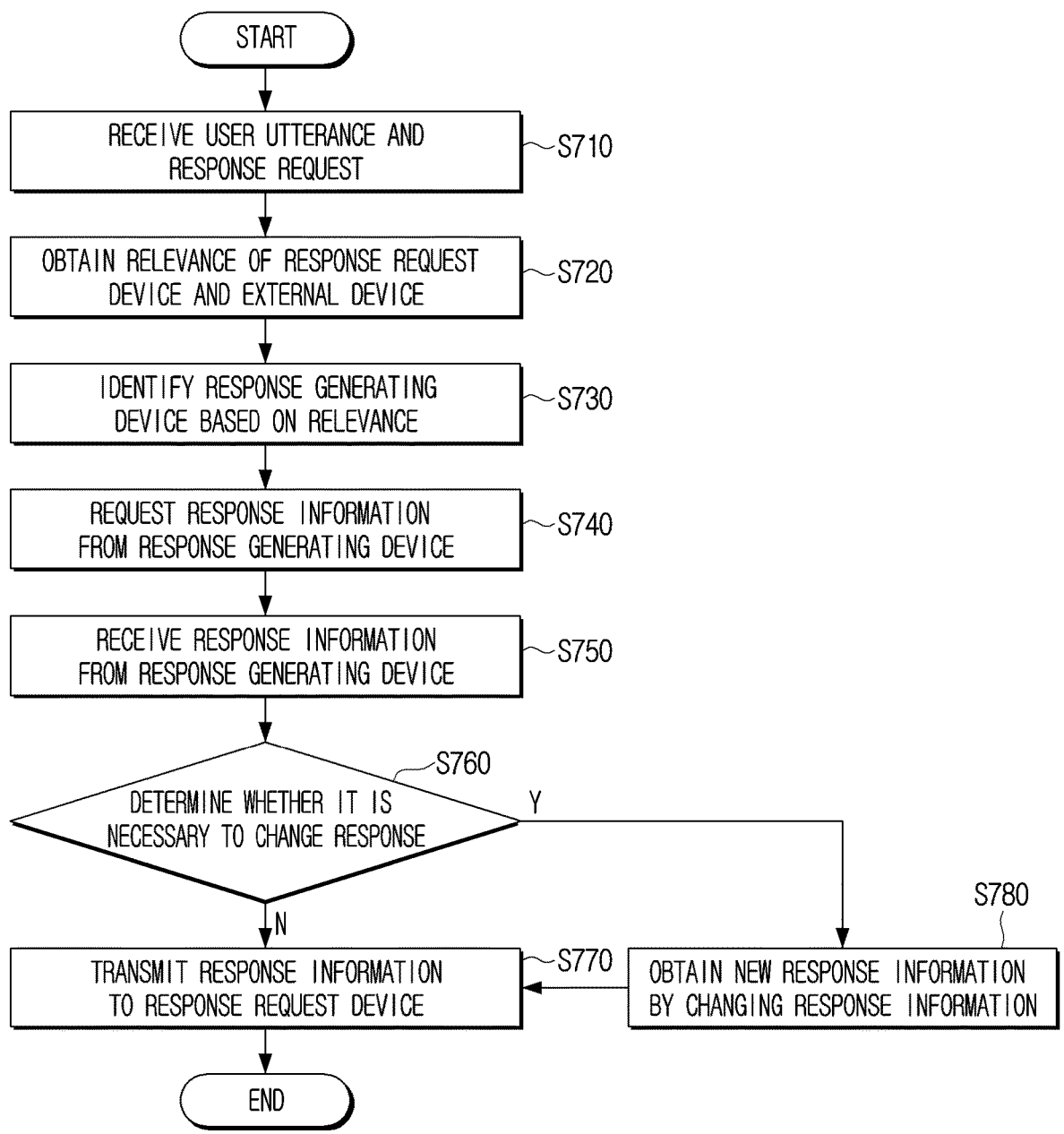
FIG. 7 is a flowchart illustrating an operation of an electronic apparatus according to an embodiment.

FIG. 7 is a flowchart illustrating an operation of an electronic apparatus according to an embodiment. The electronic apparatus 100 may receive a user utterance and a response request (operation S710). The electronic apparatus 100 may receive a user utterance and a response request from a response request device (e.g., the first external device 210 in FIG. 1).

The electronic apparatus 100 may obtain relevance between the response request device and an external device (operation S720). The electronic apparatus 100 may obtain a weight regarding an element indicating relevance between a response request device and an external device by inputting a user utterance to the first neural network model (e.g., the weight acquisition model M1 of FIG. 1). Subsequently, the electronic apparatus 100 may calculate a relevance score based on the information regarding the response request device and the weight. The information regarding the response request device may be stored in a memory of the electronic apparatus 100, or may be received together when a response request is received from the response request device.

The electronic apparatus 100 may identify a response generating device based on the relevance between the response request device and the external device (operation S730). The electronic apparatus 100 may identify an external device having the highest relevance score with respect to the response request device from among a plurality of external devices capable of performing communication as the response generating device (e.g., the second external device 200 of FIG. 1). Subsequently, the electronic apparatus 100 may request response information from the response generating device (operation S740). In this case, the electronic apparatus 100 may transmit the user utterance received from the response request device to the response generating device.

The electronic apparatus 100 may receive the response information from the response generating device (operation S750). For example, the response information may include a response type and a response content. The electronic apparatus 100 may determine whether it is necessary to change the response (operation S760). For example, the electronic apparatus 100 may identify a response type included in the received response information. Subsequently, the electronic apparatus 100 may determine whether a component (or a module) capable of performing a function corresponding to the identified response type is included in the response request device based on the information regarding the response request device. In this case, if the component capable of performing the function corresponding to the response type is not included in the response request device, the response acquisition module 135 may determine that it is necessary to change the response. Alternatively, if the component capable of performing the function corresponding to the response type is included in the response request device, the response acquisition module 135 may determine that it is not necessary to change the response.

The electronic apparatus 100 may determine whether it is necessary to change the response by comparing information regarding the specification of the response request device and information regarding the specification of the response generating device. For example, if the response request device includes a display and the response generating device does not include a display, the electronic apparatus 100 may determine that it is necessary to change the response. Alternatively, even in the case where the response request device does not include a display and the response generating device includes a display, the electronic apparatus 100 may determine that it is necessary to change the response.

If it is determined that it is not necessary to change the response (operation S760—N), the electronic apparatus 100 may transmit the received response information to the response request device (operation S770). Alternatively, if it is determined that it is necessary to change the response (operation S760—Y), the electronic apparatus 100 may obtain new response information by changing the response information (operation S780). For example, the electronic apparatus 100 may obtain the second response information corresponding to the response request device by inputting the information regarding the response request device and the first response information received from the response generating device to the second neural network model (e.g., the response conversion model M2 of FIG. 1). Subsequently, the electronic apparatus 100 may transmit the second response information to the response request device.

Figure 8:
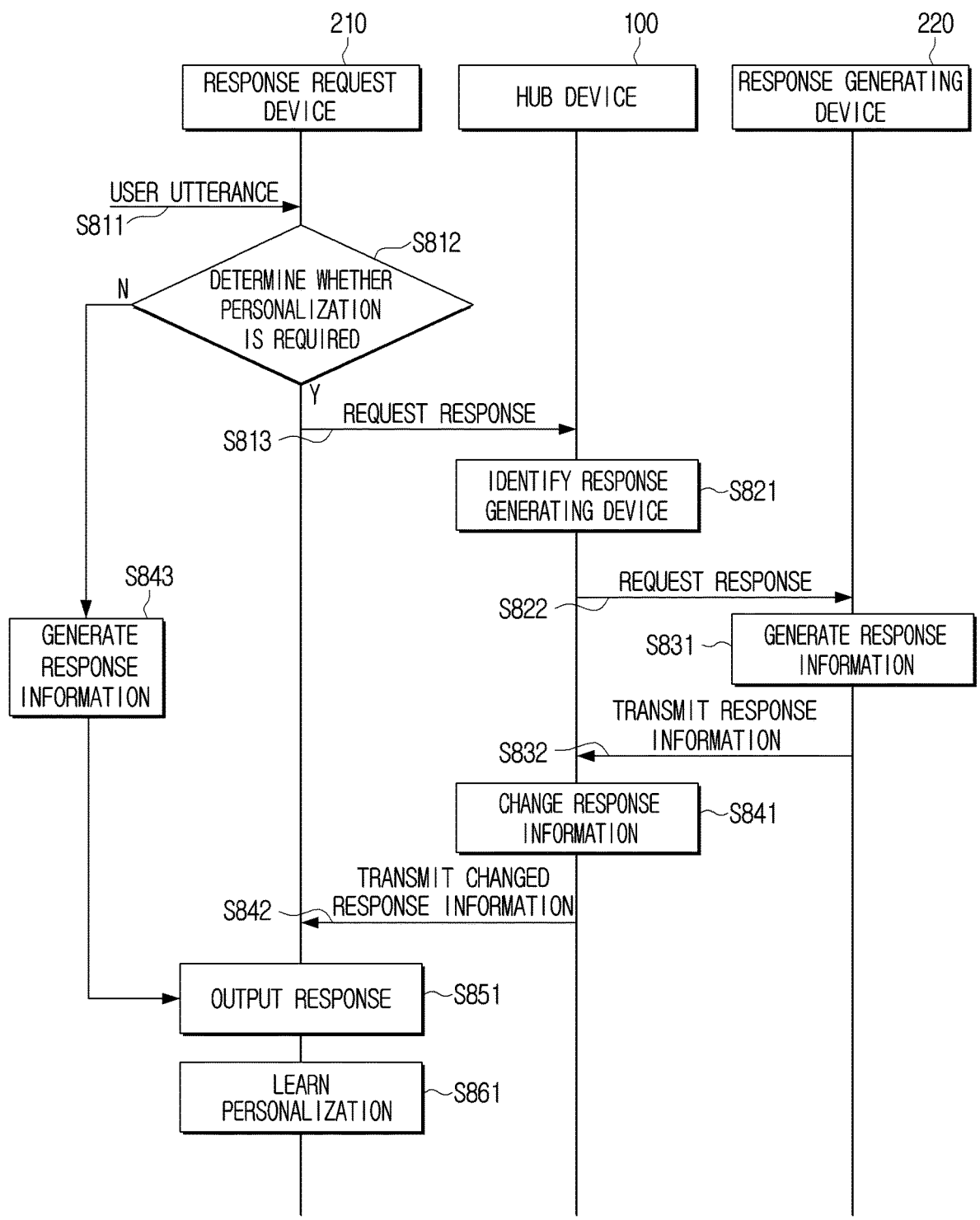
FIG. 8 is a sequence view provided to explain a conversation system according to an embodiment.

FIG. 8 is a sequence view provided to explain a conversation system according to an embodiment. The response request device 210 may obtain a user utterance (operation S811). The response request device 210 may obtain a text corresponding to the user utterance using a speech recognition module. The response request device 210 may determine whether it is necessary to perform personalization (operation S812). If the response request device 210 can understand and process the obtained text, the response request device 210 may determine that it is not necessary to perform personalization and generate response information corresponding to the user utterance (operation S843). In this case, the response request device 210 may generate response information using a natural language processing module. If the response request device 210 does not understand and process the obtained text, the response request device 210 may determine that it is necessary to perform personalization and request a response from the hub device (operation S813). In this case, the response request device 210 may transmit the text corresponding to the user utterance and the information regarding the response request device 210 to the hub device 100.

The hub device 100 may identify the response generating device based on the received text and the information regarding the response request device 210 (operation S821). As described above, the hub device 100 may identify the response generating device 220 using the weight acquisition model M1. Subsequently, the hub device 100 may request a response from the response generating device 220 (operation S822). In this case, the hub device 100 may transmit the text corresponding to the user utterance to the response generating device 220.

The response generating device 220 may generate response information based on the received text (operation S831). The response generating device 220 may understand the received text based on a natural language processing module and generate response information regarding the received text. Subsequently, the response generating device 220 may transmit the generated response information to the hub device 100 (operation S832).

The hub device 100 may change the received response information to be in a form that can be output by the response request device 210 (operation S841). As described above, the hub device 100 may change the response information using the response conversion model M2. Subsequently, the hub device 100 may transmit the changed response information to the response request device 210 (operation S842). The hub device 100 may determine whether it is necessary to change the response information. If it is determined that it is not necessary to change the response information, the hub device 100 may not change the response information, and transmit the response information to the response request device 210.

The response request device 210 may generate and output a response based on the response information received from the hub device 100 (operation S851). The response request device 210 may perform a personalization learning operation for training a natural language processing module stored in the response request device 210 (operation S861). In particular, the response request device 210 may train a language understanding module based on a text corresponding to a user utterance and response information. Accordingly, when a user utterance is obtained after the learning of the language understanding module is completed, the response request device 210 may obtain response information without the hub device 100 and the response generating device 220.

Figure 9:
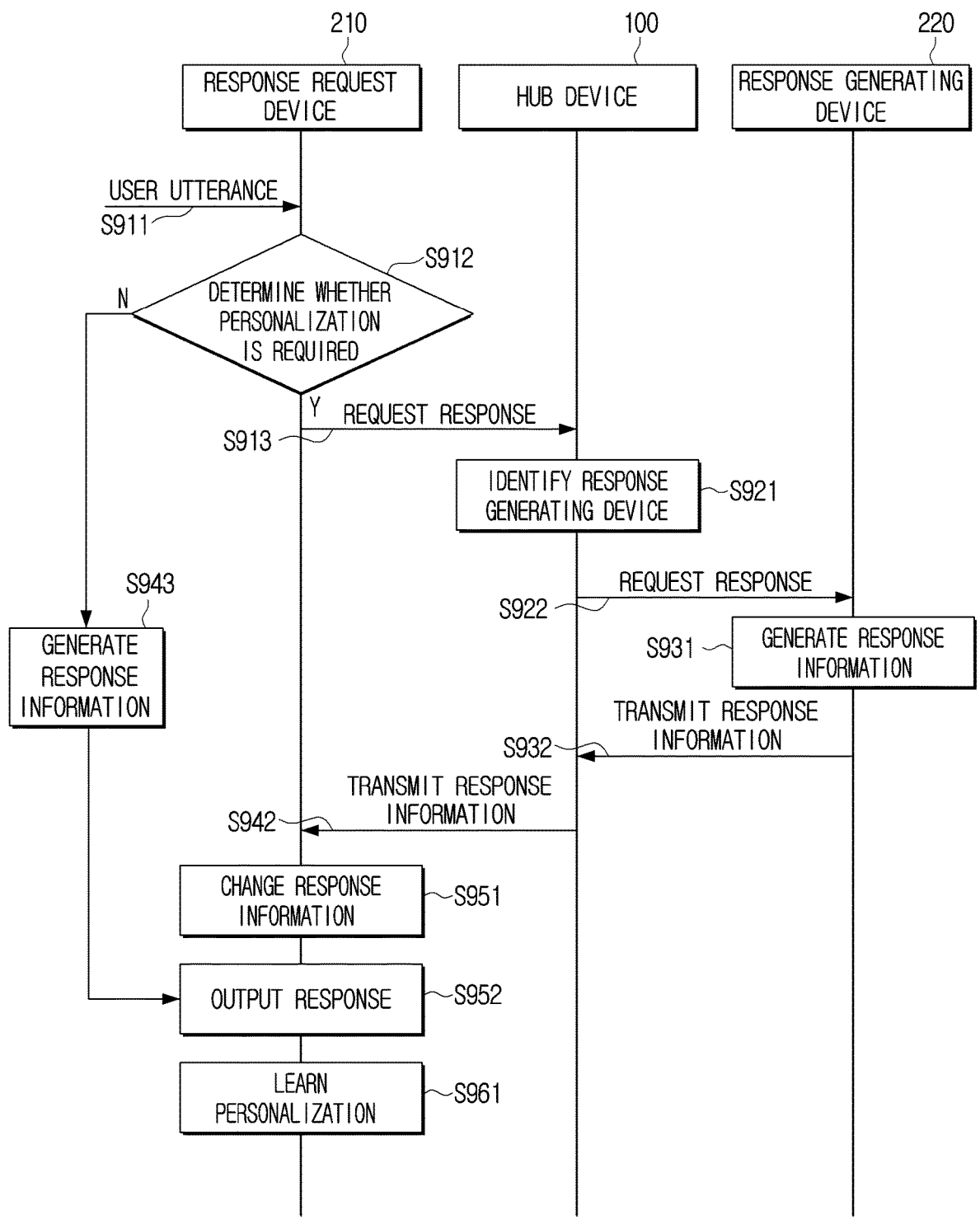
FIG. 9 is a sequence view provided to explain a conversation system according to another embodiment.

FIG. 9 is a sequence view provided to explain a conversation system according to another embodiment. Each operation of the conversation system 1000 may correspond to the operations described above with reference to FIG. 8 and thus, the overlapping description will be omitted, and difference from FIG. 8 will be described. The operation of changing response information (operation S951) may be performed by the response request device 210. The response request device 210 may obtain new response information by changing the response information received from the hub device 100. In this case, the response conversion model M2 may be stored in the response request device 210. The response request device 210 may obtain new response information by inputting the received response information and information regarding the specification of the response request device 210 to the response conversion model M2.

The example embodiments described above may be implemented by computer-readable code stored on a non-transitory computer-readable medium that can be read by a computer or an apparatus similar to the computer using software, hardware, or a combination of software and hardware. In some cases, embodiments described in the disclosure may be implemented by a processor itself. According to a software implementation, embodiments such as procedures and functions described in the specification may be implemented by separate software modules. Each of the software modules may perform one or more functions and operations described in the disclosure.

Computer instructions for performing processing operations according to the example embodiments of the disclosure described above may be stored in a non-transitory computer-readable medium. The computer instructions stored in the non-transitory computer-readable medium cause a specific device to perform the processing operations of the display apparatus according to the diverse embodiments described above when they are executed by a processor of the specific device.

The non-transitory computer-readable medium may refer to a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a ROM, and the like.

The machine-readable storage medium may be provided in a form of a non-transitory storage medium. Here, the 'non-transitory storage medium' is a tangible device and may only indicate that the device does not include a signal (e.g., electromagnetic wave). This term does not distinguish whether data are semi-permanently or temporarily stored in the storage medium. For example, the 'non-transitory storage medium' may include a buffer in which data is temporarily stored.

According to an embodiment, the methods according to the various embodiments disclosed in the disclosure may be included and provided in a computer program product. The computer program product may be traded as a product between a seller and a purchaser. The computer program product may be distributed in a form of the machine-readable storage medium (for example, a compact disc read only memory (CD-ROM)) that may be read by the machine, or distributed online (e.g. download or upload) through an application store (for example, PlayStore™) or directly between two user devices (e.g., smartphones). In the case of the online distribution, at least portions of the computer program products (e.g., downloadable app) may be at least temporarily stored or generated in the machine-readable storage medium such as a memory of a server of a manufacturer, a server of an application store or a relay server.

While example embodiments of the disclosure have been shown and described, the disclosure is not limited to the aforementioned example embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:
a communication interface;
a memory configured to store at least one instruction; and
a processor configured to execute the at least one instruction to:
receive a text corresponding to a user utterance and information regarding a first external device from the first external device via the communication interface;
obtain a plurality of weights of a plurality of elements related to the first external device by inputting the text corresponding to the user utterance to a first neural network model;
identify a second external device for obtaining response information regarding the user utterance from among a plurality of external devices based on the information regarding the first external device, information regarding the plurality of external devices, and the plurality of weights;
control the communication interface to transmit the text corresponding to the user utterance to the second external device;
receive first response information regarding the user utterance from the second external device via the communication interface;
obtain second response information corresponding to the first external device by inputting the first response information and the information regarding the first external device to a second neural network model; and
control the communication interface to transmit the second response information to the first external device,
wherein the processor is further configured to:
identify a module for performing a function corresponding to a first response type included in the first response information;
determine whether the module is included in the first external device; and
determine whether to change the first response information to the second response information based on determining whether the module is included in the first external device.

2. The electronic apparatus as claimed in claim 1, wherein the plurality of elements related to the first external device comprises:
a first element related to a similarity between a type of the first external device and types of the plurality of external devices;
a second element regarding a distance between the first external device and the plurality of external devices; and a third element regarding a relationship between an owner of the first external device and a user that uttered the user utterance.

3. The electronic apparatus as claimed in claim 1, wherein the processor is further configured to:
   calculate a plurality of scores regarding relevance between the first external device and the plurality of external devices based on the information regarding the first external device, the information regarding the plurality of external devices and the plurality of weights; and
   identify the second external device based on the second external device having a highest score from among the plurality of scores.

4. The electronic apparatus as claimed in claim 1, wherein the first neural network model comprises an intermediate model trained to predict a response to the text based on the text and the information regarding the plurality of external devices; and
   wherein the first neural network model is trained to output the plurality of weights of the plurality of elements.

5. The electronic apparatus as claimed in claim 1, wherein the processor is further configured to, based on a first type of the first external device being different from a second type of the second external, determine to change the first response information.

6. The electronic apparatus as claimed in claim 1, wherein the processor is further configured to:
   identify the first response type that cannot be output by the first external device in the first response information; and
   obtain a second response type by inputting the first response type and information regarding a specification of the first external device to the second neural network model.

7. The electronic apparatus as claimed in claim 6, wherein the second neural network model is trained to output the first response type of the first response information and the second response type of the second response information based on a module that is not common to the first external device and the second external device.

8. The electronic apparatus as claimed in claim 1, wherein the information regarding the plurality of external devices includes at least one of information regarding types of the plurality of external devices, information regarding specifications of the plurality of external devices, or information regarding locations of the plurality of external devices.

9. The electronic apparatus as claimed in claim 1, wherein the information regarding the first external device includes at least one of information regarding a relationship between a user that uttered the user utterance and an owner of the first external device, information regarding a type of the first external device, information regarding a specification of the first external device, and information regarding a distance between the first external device and the plurality of external devices.

10. A method of controlling an electronic apparatus, the method comprising:
    receiving a text corresponding to a user utterance and information regarding a first external device from the first external device;
    obtaining a plurality of weights of a plurality of elements related to the first external device by inputting the text corresponding to the user utterance to a first neural network model;
    identifying a second external device for obtaining response information corresponding to the user utterance from among a plurality of external devices based on the information regarding the first external device, information regarding the plurality of external devices, and the plurality of weights;
    transmitting the user utterance to the second external device;
    receiving first response information regarding the user utterance from the second external device;
    obtaining second response information corresponding to the first external device by inputting the first response information and the information regarding the first external device to a second neural network model; and
    transmitting the second response information to the first external device,
    wherein the method further comprises:
    identifying a module for performing a function corresponding to a first response type included in the first response information;
    determining whether the module is included in the first external device; and
    determining whether to change the first response information to the second response information based on determining whether the module is included in the first external device.

11. The method as claimed in claim 10, wherein the plurality of elements related to the first external device comprises:
    a first element related to a similarity between a type of the first external device and types of the plurality of external devices;
    a second element regarding a distance between the first external device and the plurality of external devices; and
    a third element regarding a relationship between an owner of the first external device and a user that uttered the user utterance.

12. The method as claimed in claim 10, wherein the identifying the second external device comprises:
    calculating a plurality of scores regarding relevance between the first external device and the plurality of external devices based on the information regarding the first external device, the information regarding the plurality of external devices and the plurality of weights; and
    identifying the second external device based on the second external device having a greatest score from among the plurality of scores.

13. The method as claimed in claim 10, wherein the first neural network model comprises an intermediate model trained to predict a response to the text based on the text and the information regarding the plurality of external devices; and
    wherein the first neural network model is trained to output the plurality of weights of the plurality of elements.

14. A method of controlling an electronic apparatus, the method comprising:
    receiving a text corresponding to a user utterance and information regarding a first external device from the first external device;
    obtaining a plurality of weights of a plurality of elements related to the first external device by inputting the text corresponding to the user utterance to a first neural network model;
    identifying a second external device for obtaining response information corresponding to the user utterance based on the information regarding the first external device, and the plurality of weights;

transmitting the user utterance to the second external device;

receiving first response information regarding the user utterance from the second external device;

obtaining second response information corresponding to the first external device by inputting the first response information and the information regarding the first external device to a second neural network model; and transmitting the second response information to the first external device, wherein the method further comprises:

identifying a module for performing a function corresponding to a first response type included in the first response information;

determining whether the module is included in the first external device; and determining whether to change the first response information to the second response information based on determining whether the module is included in the first external device.

15. The method as claimed in claim 14, wherein the plurality of elements related to the first external device includes:

a first element related to a similarity between a first type of the first external device and a second type of the second external device;

a second element regarding a distance between the first external device and the second external device; and a third element regarding a relationship between an owner of the first external device and a user that uttered the user utterance.

16. The method as claimed in claim 14, further comprising:

calculating a plurality of scores regarding relevance between the first external device and a plurality of external devices based on the information regarding the first external device, information regarding the plurality of external devices, and the plurality of weights; and identifying the second external device based on the second external device having a greatest score from among the plurality of scores.

17. The method as claimed in claim 14, wherein the second response information is different than the first response information.

* * * * *